United States Patent
Chaimberg et al.

(10) Patent No.: US 10,159,131 B1
(45) Date of Patent: Dec. 18, 2018

(54) DIMMABLE LED LIGHT FIXTURE MAINTAINING BRIGHTNESS DURING COLOR TEMPERATURE CHANGE

(71) Applicant: Adam Chaimberg, Hampstead (CA)

(72) Inventors: Adam Chaimberg, Hampstead (CA); Xianwen Xiong, Lin'an Hang Zhou (CN)

(73) Assignee: Adam Chaimberg, Hampstead, QC (CA)

( * ) Notice: Subject to any disclaimer, the term of this patent is extended or adjusted under 35 U.S.C. 154(b) by 0 days.

(21) Appl. No.: 15/932,853

(22) Filed: May 9, 2018

(30) Foreign Application Priority Data

Mar. 26, 2018 (CA) ...................................... 2999307

(51) Int. Cl.
| | | |
|---|---|---|
| H05B 37/00 | (2006.01) | |
| H05B 39/00 | (2006.01) | |
| H05B 41/14 | (2006.01) | |
| H05B 33/08 | (2006.01) | |

(52) U.S. Cl.
CPC ....... H05B 33/086 (2013.01); H05B 33/0815 (2013.01)

(58) Field of Classification Search
None
See application file for complete search history.

(56) References Cited

U.S. PATENT DOCUMENTS

| | | | | |
|---|---|---|---|---|
| 8,912,734 B2 * | 12/2014 | Melanson | .......... | H05B 33/0815 315/192 |
| 2014/0191674 A1 * | 7/2014 | Baddela | ............... | H05B 33/086 315/192 |
| 2016/0128155 A1 * | 5/2016 | Petluri | ............... | H05B 33/0857 315/294 |

* cited by examiner

*Primary Examiner* — Anh Q Tran
(74) *Attorney, Agent, or Firm* — Guy J. Houle; Houle Patent Agency Inc.

(57) ABSTRACT

An LED light fixture, in the form of lamps or luminaires, is comprised on a plurality of LED lights producing bright white or warm light and a plurality of color LED lights producing light of a visibly different color. The fixture includes control circuitry for receiving an input voltage signal from a dimmer switch wherein when the dimmer switch reduces the input voltage to the LED light fixture within a top range setting of the dimmer switch, the brightness of the light is maintained while the color Kelvin temperature of the light spectrum is reduced. If the dimmer switch is increased in the top range, the color temperature increases. This is achieved by increasing the frequency of a reduced input voltage signal during a reduction of the dimmer switch in the top range thereof to supply full driver current to the white or warm light LED's while reducing the driver current to the color LED's. When the dimmer switch is operated below the top range both drive currents to the while and color LED's is reduced to provide a warm relaxing light spectrum but with substantially high luminosity/brightness.

18 Claims, 3 Drawing Sheets

DIMMABLE LED LIGHT FIXTURE MAINTAINING BRIGHTNESS DURING COLOR TEMPERATURE CHANGE

TECHNICAL FIELD

The represent invention relates to LED light fixture and more particularly to a dimmable LED light fixture, in the form of lamps or luminaires, and control circuitry and method of operation for maintaining brightness of the LRD light source while changing color temperature across the range of an AC dimmer switch.

BACKGROUND OF THE INVENTION

LED lighting is gradually replacing the traditional incandescent lamp and CFL because of its advantages of energy efficiency, long life and non-pollution aspect. It is now common to see Triac dimmers used in conjunction with traditional incandescent lamps. The principle of triac dimmers is to control the thyristor conduction by the triac dimmer's inner time delay circuit. The longer the conduction time, the more energy is transmitted achieving higher brightness output for incandescent lamps.

The luminosity principle of incandescent lamps is through the production of thermal radiation which in turn emits visible light via the tungsten filament. Its equivalent to a purely resistance load in electricity. Therefore, triac dimmers suit incandescent lamps perfectly, allowing users to adjust the brightness output as needed. Due to the characteristic of thermal radiation, the color temperature of incandescent lamps will decrease from 2700 Kelvin temperature to about 2000 Kelvin temperature when the brightness output is low, which is close to the color temperature at sunset.

Through evolution in technology, LED lamps can also be compatible with traditional triac dimmers. LED lamps can achieve smooth and linear adjustment of brightness by controlling a triac dimmer. However, due to the LED's luminescent properties, the color temperature of LED lamps will not change with a change in driver current. In order to achieve a change in color temperature similar to an incandescent lamp, LED technology uses two or more color temperature variations of LED chips, generally 3000 Kelvin temperature and 2000 Kelvin temperature chips. The current ratio mix is adjusted for the different LED chips allowing the light fixture to achieve this function. Using this advancement in technology, triac dimmers can adjust the brightness output and color temperature concurrently.

Color temperature can be described in terms of the color emitted by a light fixture with a spectrum from bright light, such as daylight, to warm soothing amber light such as at dusk. LED light sources do not exhibit visible spectrum radiation at all wave lengths of the spectrum and are measured according to a correlated color temperature (CCT) scale. It would be desirable to be able to operate LED light sources to produce variable color from bright white to amber tone while maintaining bright luminosity. Such would create a light environment which is warm, cozy and relaxing such as is desirable during dinning or working late over a desk top or in front of a computer. It is well known that bright light stimulates the senses of a person and can be disruptive to a person's health particularly when exposed to bright light at night time creating the effect of jet lag, poor sleep and lack of energy during the day. It could also lead to other adverse conditions such as disruption of vital hormone production.

There is therefore a need to provide a dimmable LED light fixture, in the form of lamps or luminaires, and method of operation capable of overcoming the above mentioned disadvantages of LED lighting and thus providing an LED light environment wherein the Kelvin temperature of the LED light source is down to about 3000 to 2000 Kelvin while maintaining maximum brightness.

SUMMARY OF THE INVENTION

It is therefore a feature of the present invention to provide a dimmable LED light fixture, in the form of lamps or luminaires, and control circuitry as well as its method of operation which is capable of operating LED lamps and luminaires provided with LED light sources which are capable of maintaining brightness level while changing the color temperature of the light spectrum.

According to the above feature, from a broad aspect, the present invention provides a dimmable LED light fixture, in the form of lamps or luminaires, and control circuitry for maintaining brightness while changing color temperature. The fixture incorporates a first LED light source producing white or warm light and a second LED light source producing light of a visibly different color in a reduced or increased Kelvin temperature range from the first LED light source. The control circuitry has input terminals connectable to an AC power source equipped with a dimmer switch having a variable switch control to decrease or increase the supply voltage. A dimming signal processing circuit has a first integrated logic circuit configured to generate a constant high frequency RMS voltage signal to a first primary winding of an output transformer feeding a composite signal to a correlated color temperature (CCT) signal processing circuit representative of a reduced or increased input voltage within a top range of the dimmer switch. The reduced or increased RMS input voltage is connected to a second primary winding of the input transformer. The correlated color temperature (CCT) signal processing circuit receives the composite high frequency RMS voltage signal from a secondary winding of the output transformer which is converted to a DC input voltage supplied to a further integrated logic circuit producing a DC output voltage proportional to the composite signal for operating semi-conductor switches associated with respective ones of the first and second LED light sources and which provides drive current proportional to the constant high frequency signal to the first LED light source and a reduced or increased drive current proportional to the reduced or increased input voltage to the second LED light source. The variable switch control of the dimmer switch when displaced below the top range generates an input signal to the first integrated logic circuit which is below threshold of the logic circuit causing the high frequency voltage signal of the first integrated logic circuit to be reduced whereby the further integrated logic circuit will modify its output voltage to the semi-conductor switches to cause the first and second LED light sources to reduce in total brightness and color temperature, simultaneously.

According to a further broad aspect of the present invention, there is provided a method of operating a dimmable LED light fixture in the form of lamps or luminaires to produce a light spectrum of substantially constant bright light while reducing or increasing the Kelvin temperature of the light to change the color of the bright light across an entire dimmable range of a dimmer switch. The method comprises the steps of:

i) providing an LED light fixture with first and second light sources, one of which is a white or warm light source and the other of which is of a visibly different color;

ii) producing a reduced RMS voltage at an input of a drive signal processing circuit proportional to a reduced or increased range setting of the dimmer switch;

iii) detecting if the RMS voltage is in a top range of the dimmer switch;

iv) generating a constant high frequency voltage signal to produce a composite high frequency RMS voltage signal at an input of a correlated color temperature (CCT) signal processing circuit if a variable switch control of the dimmer switch is reduced within the top range, and v) driving the first light source to produce full brightness and the second light source to produce a reduced or increased Kelvin temperature proportional to a decreased or increased setting of the switch control of the dimmer switch within the top range.

BRIEF DESCRIPTION OF THE DRAWINGS

A preferred embodiment of the present invention will now be described with reference to the accompanying drawings in which.

DESCRIPTION OF THE PREFERRED EMBODIMENT

Figure 1:
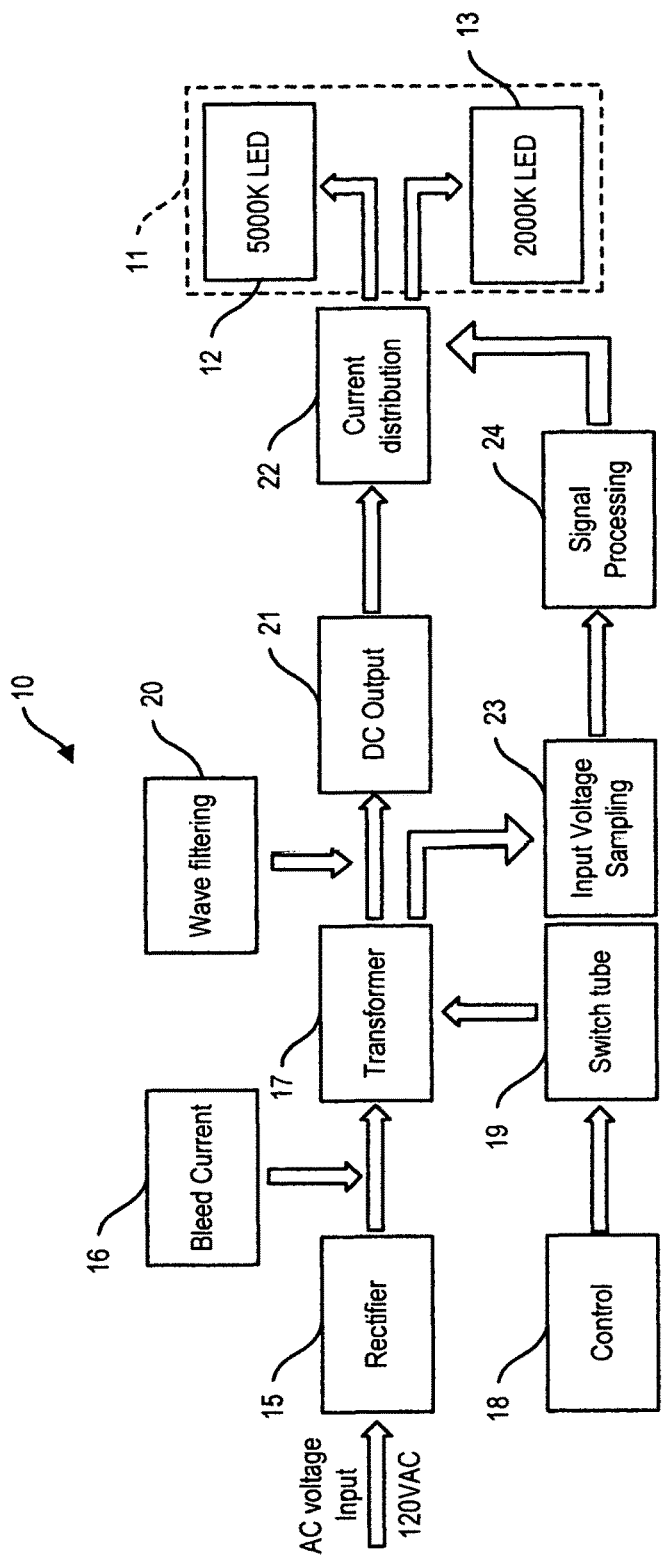
FIG. 1 is a simplified block diagram representative of the construction and basic component parts of the control circuitry of the present invention for maintaining brightness while simultaneously reducing or increasing the Kelvin temperature of an LED fixture operated by a dimmer switch in a top range of the dimmer switch and wherein the fixture incorporates two LED light sources of visibly different color, one of which produces white or warm light.

Referring now to the drawings and more specifically to FIG. 1 there is shown generally at 10 the control circuitry associated with an LED light fixture 11, which can be in the form of lamps or luminaires, in which is mounted two LED light sources 12 and 13. The LED light source 12 is formed by a plurality of LED lights 12' (see FIG. 2B) generating daylight white or warm light having a Kelvin temperature of 5000 Kelvin and the light source 13 is formed by another plurality of LED lights 13' producing light of visibly different color, herein an amber luminosity, such as sunset, having a Kelvin temperature of 2000 Kelvin. These LED light sources are mounted in a predetermined pattern inside the light fixture to produce a uniformly distributed light spectrum.

Figure 2A:
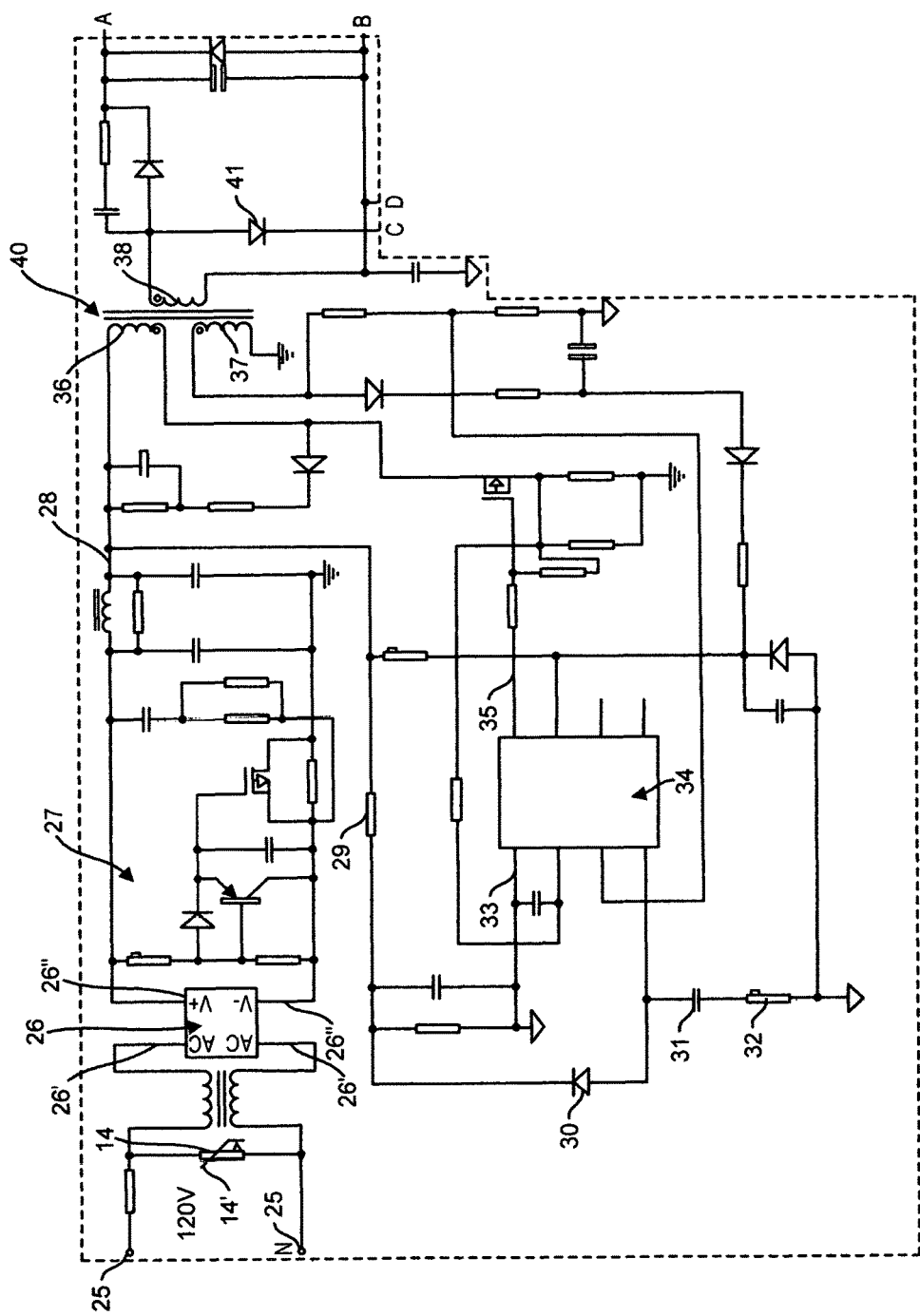
FIG. 2A is a schematic diagram of the dimming circuit portion, forming a first part, of the control circuitry connected to a dimmer switch.

Summarizing the operation of the control circuitry, an AC voltage input voltage is received from a dimmer switch 14, as illustrated in FIG. 2A, and fed to a rectifier circuit 15 which feeds a bleed current 16, representative of a reduced or increased voltage setting of the dimmer switch, to a primary winding of a transformer 17. The control 18 and switch tube 19 constitutes a circuit which includes an integrated logic circuit which is configure to generate a constant high frequency voltage signal during dimmer switch adjustments in a top range of the dimmer switch to feed a constant high frequency voltage to a second primary winding of the transformer 17, as will be described in more detail with respect to FIGS. 2A and 2B. The composite signal at the secondary winding of the transformer 17 is wave filtered by circuitry 20 to feed an input DC signal proportional to the RMS voltage at the secondary winding of the transformer to a current distribution circuit 22 including semi-conductor switches for setting the drive current of the color LED light source 13. An input voltage sampling circuit 23 also receives the high frequency RMS voltage signal from the secondary winding of the transformer 17 to feed the integrated logic circuit 22 which produces an output control voltage to the current distribution at 22 containing semi-conductor switches to drive the white or warm LED light source 12. When the bleed current 16 falls below the top range of the dimmer switch, the current distribution to both of the LED light sources 12 and 13 is reduced in Kelvin temperature proportional to the reduction of the dimmer switch variable control 14'.

The invention will now be described with more details with additional reference to FIGS. 2A and 2B. Firstly, summarizing the operation of the control circuitry 10, it performs the following function. When the dimmer switch control 14' reduces or increases the input voltage to the control circuitry 10 in the top range from 100% to 80%, the LED light fixture 11 maintains brightness while the color temperature changes, and as described in this embodiment, from 5000 Kelvin temperature to 3000 Kelvin temperature, and when the dimmer switch control 14' reduces the input voltage below 80% down to 0%, the brightness as well as the color temperature will change simultaneously, ie. from 3000 Kelvin temperature to 2000 Kelvin temperature. This is accomplished as described below.

As herein shown, the dimmer switch 14 is connected across the conventional 120 volt household supply voltage 25 and feeds a reduced voltage to input terminals 26' of an AC/DC converter 26. The output signal at the terminals 26" of the converter 26 is treated by the circuit 27 to produce at its output connection 28 a proportional RMS voltage signal which is connected to a bridge rectifier composed of resistance 29, diode 30, capacitor 31 and resistance 32. The rectified RMS voltage signal is fed to an input terminal 33 of a first integrated logic circuit 34. If the RMS signal at the input terminal 33 is of a value indicating that the switch control 14' is displaced in the top range of the dimmer switch from 100% to 80%, the logic circuit is configured to generate a constant high frequency voltage signal at its output terminal 35 representative of the switch control 14' being at the 100% position, although it is not, that is to say at full input voltage. This high frequency voltage signal is connected to a first primary winding 36 of an output transformer 40. The second primary winding 37 of the output transformer 40 is connected to the reduced or increased RMS voltage signal, in the top range, at the output connection 28 through diodes and resistances. The secondary winding 38 of the transformer 40 thus produces a composite RMS high frequency voltage signal across it's winding.

The composite RMS frequency signal is then converted by diode 41, resistances 42 and 43 and capacitor 44 to provide a suitable input control signal to the input terminal 45 of a further integrated logic circuit 46. The integrated logic circuit 46 is conditioned to provide dedicated power management to drive the LED light sources 12 and 13 depending on the input control signal that it receives from the output transformer 40 and which is dependent on the dimmer switch setting.

Figure 2B:
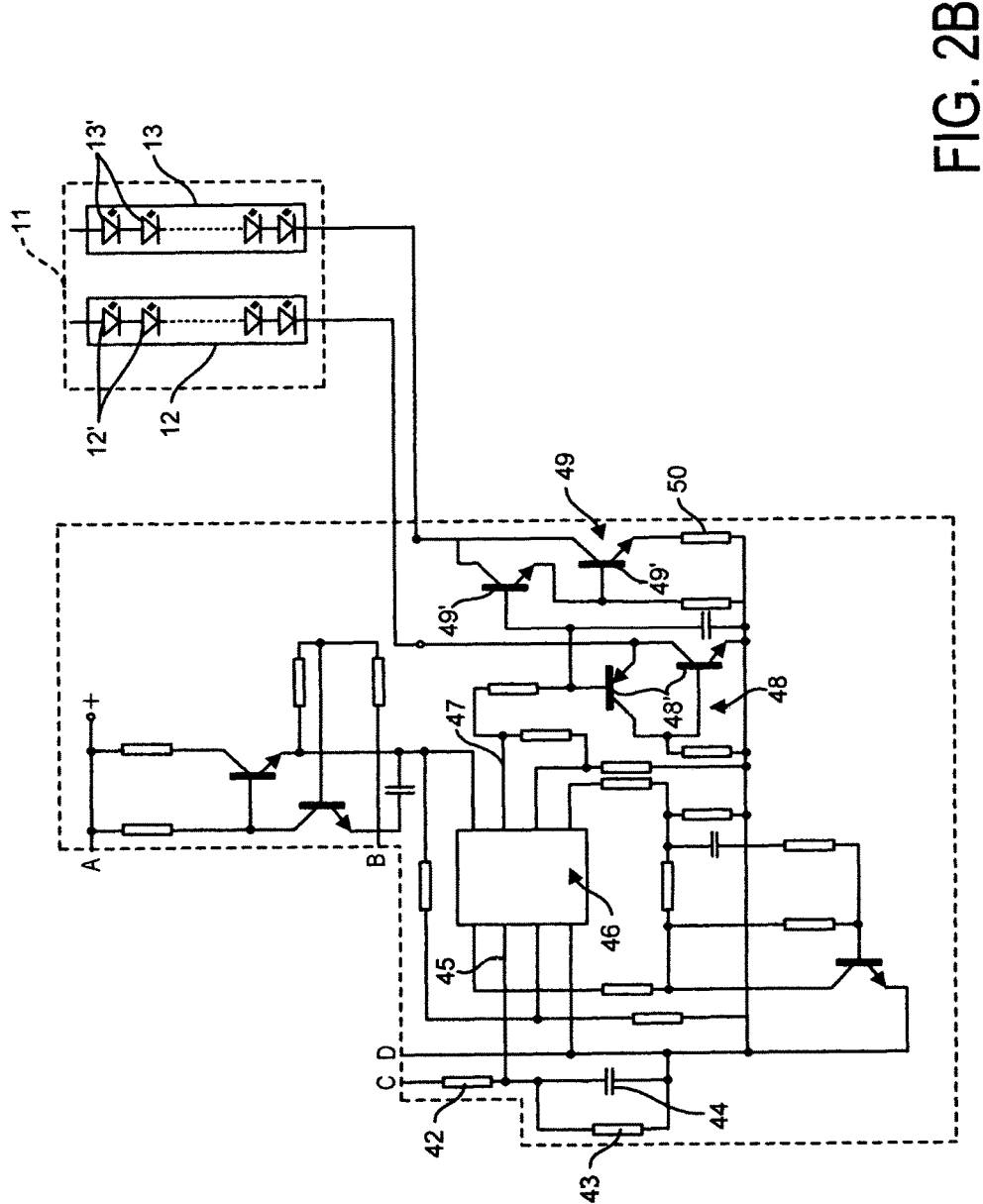
FIG. 2B is a schematic diagram of the correlated color temperature (CCT) signal processing circuit, forming the second part, of the control circuitry. The circuit parts of FIGS. 2A and 2B are interconnected together at connection points A, B, C and D

As shown in FIG. 2B, the output terminal 47 of the further integrated logic circuit 46 generates an output voltage to distribute drive currents to two semi-conductor switches, herein dynatron circuits 48 and 49 associated with respective ones of said LED light sources 12 and 13 respectively. The dynatron circuits 48 and 49 are each comprised of two dynatrons 48' and 49', respectively, which are configured as Darlington switches. With the dimmer switch 14 being operated in the top range from 100% to 80%, the current distribution will maintain the LED light source 12 at full brightness through dynatron 48" having a constant drive current while the drive current to LED light source 13, through the dynatrons 49' and resistance 50, is reduced or increased in proportion to the reduced or increased input signal produced by the dimmer switch setting in the top range. Accordingly, total brightness is maintained by the LED light source 13 while the Kelvin temperature is reduced or increased by the LED light source 13 producing a change in color while full brightness is maintained. In the top range, the Kelvin temperature of the color LED light source is reduced from 5000 Kelvin to about 3000 Kelvin, as pointed out herein above, while the white or warm light LED's remain at 5000 Kelvin temperature.

When the dimmer switch control 14' of the dimmer switch 14 is reduced below 80%, the RMS reduced signal at the input 33 of the first integrated logic circuit 34 will decrease and cause the frequency signal at its output 35 to be reduced proportionately as the input signal is now below the threshold value of the logic configuration of the logic circuit 34, threshold being set in this embodiment at 80% input signal. Accordingly, the signal at the secondary winding 38 of the output transformer 40 will now supply a reduced RMS voltage frequency signal at the input 45 of the further integral logic circuit 46 causing the logic circuit 46 to decrease the total current to supply the LED light sources 12 and 13 causing total brightness to be reduced but only slightly as the colored LED light source drops from about 3000 Kelvin to about 2000 Kelvin and thereby generate a deep amber light with sufficient brightness, produced by the bright light LED light source 12, and creating a relaxing uniformly distributed light spectrum Although the above embodiment describes a control circuit and LED light sources of specific Kelvin temperatures, it is pointed out that the change in the color temperature should not be limited to 5000K-3000K-2000K, but can also be any other continuous color temperatures. It can also be a light spectrum change from a low color temperature to a high color temperature. Also, the dimmer switch top range does not necessarily be from 100% to 80% as it can be any reduced setting going very low while keeping the same wattage to provide brightness while changing color temperature. Still further the color LED's may be separated in groups of different color LED's to produce a different color tone to the light spectrum.

The method of operating the dimmable LED light fixture 25 to produce a light spectrum of substantially constant bright light while reducing the Kelvin temperature of the light to change the color of the bright light across an entire predetermined dimmable range of an AC dimmer switch can be summarized as follows. The light fixture needs to be provided with an LED light source which produces white or warm light or daylight white light in the Kelvin range of about 5000K to 6000K, in this embodiment 5000K, and an LED light source for producing light of a visibly different color, for example red or amber color in the range of about 2000K. The LED light sources 12 and 13 consist of a plurality of light emitting diodes arranged in a suitable pattern to produce a uniformly distributed light spectrum.

When the dimmable switch reduces the input voltage to reduce the output luminosity of the light fixture within a predetermined top range setting of the dimmable switch 14, the control circuitry produces a signal which is modified to maintain the LED bright lights at full brightness but simultaneously causing the LED color lights to reduce or increase in Kelvin temperature causing a change in color towards a deeper or brighter color. When the dimmable switch reduces below the top range, the control circuitry cause a further reduction of the Kelvin temperature of the color LED lights as well as a reduction of the Kelvin temperature of the bright lights.

The above method can be broadly summarized by the following steps:

i) providing an LED light fixture with first and second light sources, one of which is a white or warm light source and the other of which is of a visibly different color;

ii) producing a reduced RMS voltage at an input of a drive signal processing circuit proportional to a reduced or increased range setting of the dimmer switch;

iii) detecting if the RMS voltage is in a top range of the dimmer switch;

iv) generating a constant high frequency voltage signal to produce a composite high frequency RMS voltage signal which is converted to a DC input voltage supplied at an input of a correlated color temperature (CCT) signal processing circuit if a variable switch control of the dimmer switch is reduced within the top range, and v) driving the first light source to produce full brightness and the second light source to produce a reduced Kelvin temperature proportional to a decreased or increased setting of the switch control of the dimmer switch within the top range.

It is within the ambit of the present invention to include any obvious modifications of the preferred embodiment described herein above provided such obvious modifications fall within the scope of the appended claims.

The invention claimed is:

1. A dimmable LED light fixture, in the form of lamps or luminaires, and control circuitry for maintaining brightness while changing color temperature comprising a first LED light source producing white or warm light and a second LED light source producing light of a visibly different color in a reduced or increased Kelvin temperature range from said first LED light source, said control circuitry having input terminals connectable to a power source equipped with a dimmer switch having a variable switch control, a dimming signal processing circuit having a first integrated logic circuit configured to generate a constant high frequency RMS voltage signal to a first primary winding of an output transformer to feed a composite RMS frequency signal to of a correlated color temperature (CCT) signal processing circuit representative of a reduced or increased RMS input voltage within a top range of said dimmer switch, said reduced or increased RMS input voltage being connected to a second primary winding of said input transformer, said correlated color temperature (CCT) signal processing circuit receiving said composite high frequency RMS voltage signal at a secondary winding of said input transformer which is converted to a DC input voltage of a further integrated logic circuit producing a DC output voltage proportional to said composite signal for operating semi-conductor switches associated with respective ones of said first and second LED light sources and which provide a drive current proportional to said constant high frequency signal to said first LED light source and reduced or increased current proportional to said reduced or increased input voltage to said second LED light source, said variable switch control of said dimmer switch when displaced below said top range generates an input signal to said first integrated logic circuit which is below threshold of the first integrated logic circuit causing said high frequency RMS voltage signal of said first integrated logic circuit to be reduced whereby said further integrated logic circuit will modify its output voltage to the semi-conductor switches to cause said first and second LED light sources to reduce in total brightness and color temperature.

2. The dimmable LED light fixture and control circuitry as claimed in claim 1 wherein said power source is an AC power source, said semi-conductor switches are dynatron switches, said input terminals of said control circuitry being connected to two input terminals of an AC/DC converter circuit receiving an RMS input voltage proportional to a dimmer setting of said variable switch control of said dimmer switch, said RMS input voltage being connected to a bridge rectifier circuit connected to input terminals of said first integrated logic circuit.

3. The dimmable LED light fixture and control circuitry as claimed in claim 2 wherein said further integral logic circuit is connected to said composite high frequency RMS voltage signal at said secondary winding of said input transformer through a diode, a resistor and an RC circuit to provide wave filtering of said composite high frequency RMS voltage signal.

4. The dimmable LED light fixture and control circuitry as claimed in claim 2 wherein said dynatron switches associated with said first and second LED light sources constitutes a Darlington switch comprised of two dynatron, said second LED light source receiving said DC output voltage which modifies the base current of said dynatrons to supply a drive current to a value proportional to said reduced or increased input voltage whereby to produce a reduced or increased Kelvin temperature color radiated by said second LED light source.

5. The dimmable LED light fixture and control circuitry as claimed in claim 4 wherein the other of said dynatron switches are connected to an output of said further integral logic circuit to receive a drive current proportional to said constant high frequency RMS voltage signal during said top range setting of said variable control of said dimmer switch and to receive a reduced or increased drive current below said top range and proportional to a setting of said variable control of said dimmer switch.

6. The dimmable LED light fixture and control circuitry as claimed in claim 1 wherein said top range of said dimmer switch is of the order of from 100% to about 80% of said dimmer switch variable setting or any other top range as desired to maintain brightness while reducing color temperature.

7. The dimmable LED light fixture and control circuitry as claimed in claim 1 wherein said first and second LED light sources are comprised of a plurality of said LED light sources arranged in patterns in said light fixture to produce a uniform distributed light spectrum.

8. The dimmable LED light fixture and control circuitry as claimed in claim 7 wherein said plurality of said first LED light sources have a color temperature of 5000 Kelvin temperature producing a daylight white or warm luminosity, said second LED light sources having a color temperature of 2000 Kelvin temperature producing an amber color luminosity.

9. The dimmable LED light fixture and control circuitry as claimed in claim 8 wherein said second LED light sources generate about 3000 Kelvin temperature when said driver signal at said secondary winding is at a bottom end of said top range with said first set of LED light sources being maintained at said 5000 Kelvin temperature.

10. The dimmable LED light fixture and control circuitry as claimed in claim 9 wherein said variable dimmer switch control when displaced below said top range to a bottom end of its dimming level will cause a reduction of the Kelvin temperature of said second LED light sources to reduce to 2000 Kelvin temperature producing a soft amber color while said first LED light sources intensity is unnoticeably diminished creating a warm cozy environment while maintaining substantially unaltered brightness.

11. A method of operating a dimmable LED light fixture, in the form of lamps and luminaires, to produce a light spectrum of substantially constant bright light while reducing or increasing the Kelvin temperature of said light to change the color of said bright light across an entire dimmable range of a dimmer switch, said method comprising the steps of:
    i) providing an LED light fixture with first and second light source, one of which is a white or warm light source and the other of which is of a visibly different color source;
    ii) producing a reduced RMS voltage at an input of a drive signal processing circuit proportional to a reduced or increased range setting of said dimmer switch;
    iii) detecting if said RMS voltage is in a top range of said dimmer switch;
    iv) generating a constant high frequency voltage signal to produce a composite high frequency RMS voltage signal which is converted to a DC input voltage supplied to an input of a correlated color temperature (CCT) signal processing circuit if a variable switch control of said dimmer switch is reduced within said top range, and v) driving said first light source to produce full brightness and said second light source to produce a reduced or increased Kelvin temperature proportional to a decreased setting of said switch control of said dimmer switch within said top range.

12. The method as claimed in claim 11 wherein said steps (iii) and (iv) comprises an integrated logic circuit which upon reception of said RMS voltage at an input thereof will generate said constant high frequency RMS voltage signal if said variable switch control dimmer switch is displaced within said top range and which will further generate a decreased output frequency signal proportional to a reduction of said RMS voltage at said input thereof if below said top range of said variable switch control.

13. The method as claimed in claim 12 wherein said step (iv) further comprises the steps of feeding said constant high frequency RMS voltage signal to a first primary winding of an output transformer to feed a composite RMS control signal to said correlated color temperature (CCT) signal processing circuit and further feeding said reduced or increased RMS voltage to a second primary winding of said input transformer to produce a composite high frequency RMS voltage signal at a secondary winding of said output transformer which is reduced or increased to supply an input voltage of a further integrated logic circuit.

14. The method as claimed in claim 13 wherein said step (v) comprises feeding said composite high frequency RMS voltage signal present at said secondary winding of said input transformer to a wave filtering circuit to produce said input voltage of said further integrated logic circuit which produce an output voltage signal to operate semi-conductor switches to supply proportional drive currents for driving said first and second LED light sources.

15. The method as claimed in claim 14 wherein said output voltage signal of said further integrated logic circuit is connected respectively to a dynatron circuit of each said LED light sources, said dynatron circuits producing drive currents for operating said first and second LED light sources, said second LED light source having its drive current continuously decreased upon displacement of said variable switch control throughout its full switch travel distance, said first LED drive current remaining constant during the displacement of said variable switch control in said top range of said variable switch control and being decreased after said variable switch control is displaced below said top range.

16. The method as claimed in claim 11 wherein said step (i) comprises providing a plurality of said white or warm light LED's and a plurality of said second light sources of different color and securing same in a predetermined pattern in said light fixture to produce a uniformly distributed light spectrum, said white or warm light LED's having a color temperature of 5000 Kelvin temperature to produce daylight white or warm luminosity, said second light sources having a color temperature of 2000 Kelvin temperature producing an amber luminosity.

17. The method as claimed in claim 16 wherein said step (v) comprises reducing said second light sources to about 3000 Kelvin temperature when said variable switch control is displaced to an end of said top range.

18. The method as claimed in claim 17 wherein said second light sources are reduced to about 2000 Kelvin temperature when said variable switch control is displaced to an end of its total dimmer switch travel distance.

* * * * *